Sept. 1, 1970 C. J. FOX 3,526,501
4-DIARYLAMINO-SUBSTITUTED CHALCONE CONTAINING PHOTOCONDUCTIVE
COMPOSITIONS FOR USE IN ELECTROPHOTOGRAPHY
Filed Feb. 3, 1967 3 Sheets-Sheet 1
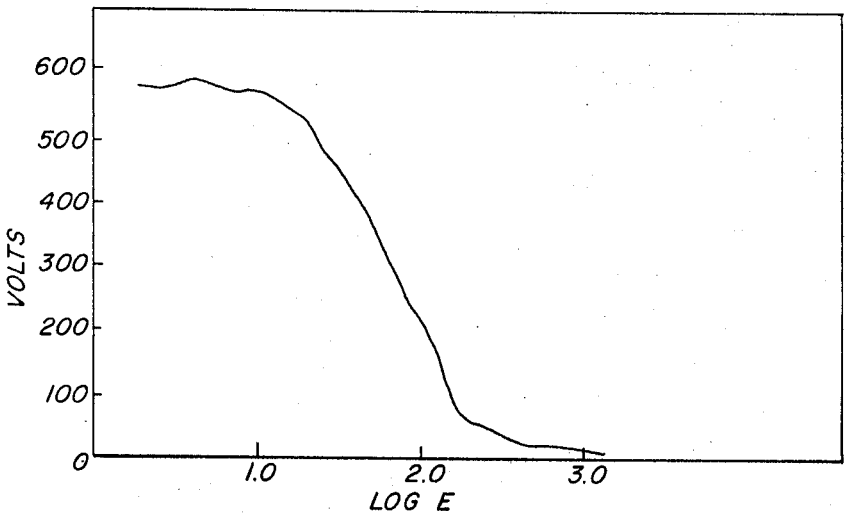
FIG. 1
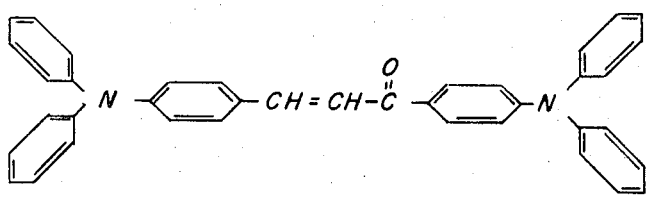
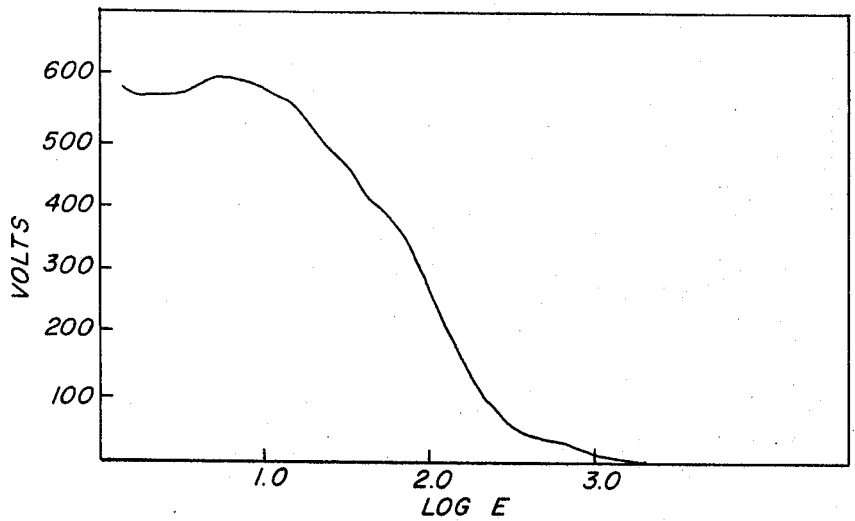
FIG. 2
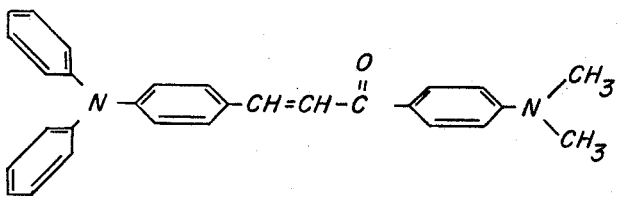
CHARLES J. FOX
INVENTOR.
BY *J Wm Burkitrum*
ATTORNEY

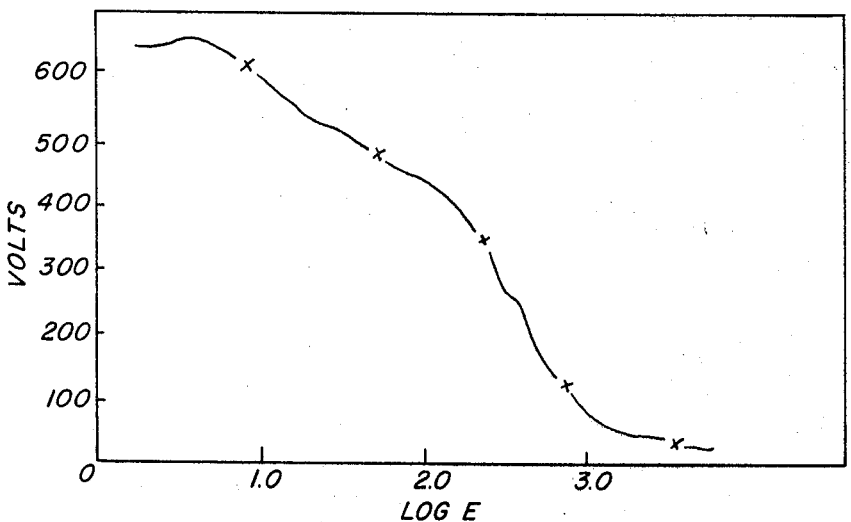
FIG. 3
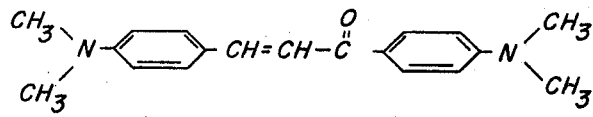
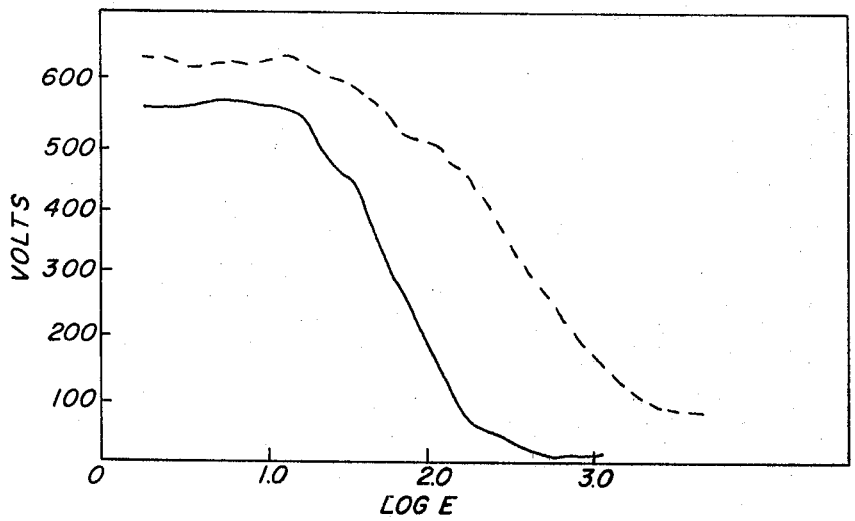
FIG. 4
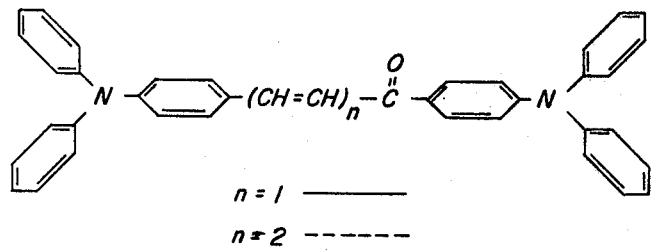
n = 1 ———
n = 2 - - - - -

Sept. 1, 1970  C. J. FOX  3,526,501
4-DIARYLAMINO-SUBSTITUTED CHALCONE CONTAINING PHOTOCONDUCTIVE
COMPOSITIONS FOR USE IN ELECTROPHOTOGRAPHY
Filed Feb. 3, 1967  3 Sheets-Sheet 3
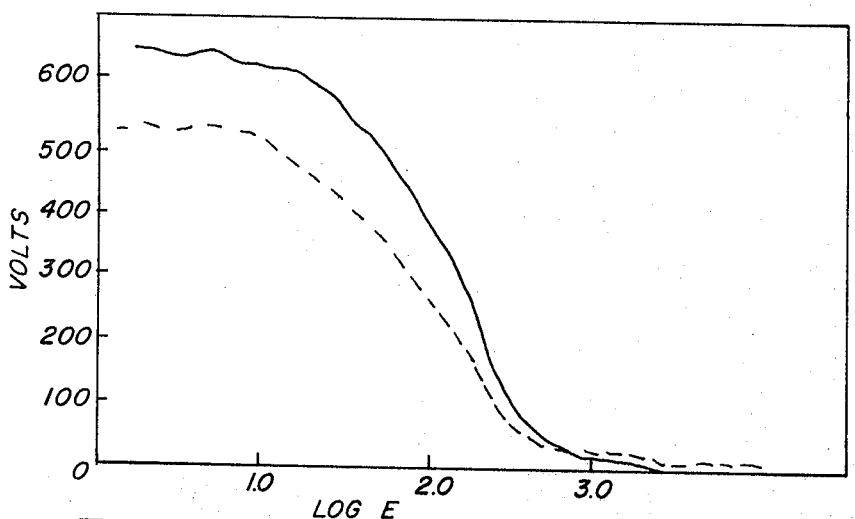
*FIG. 5*
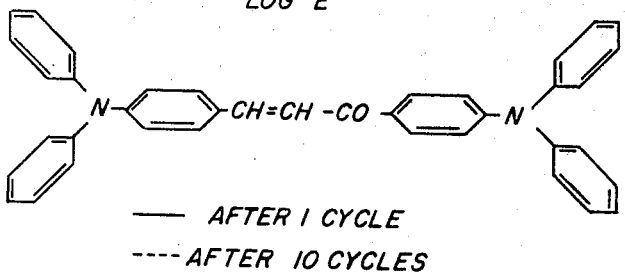
— AFTER 1 CYCLE
---- AFTER 10 CYCLES
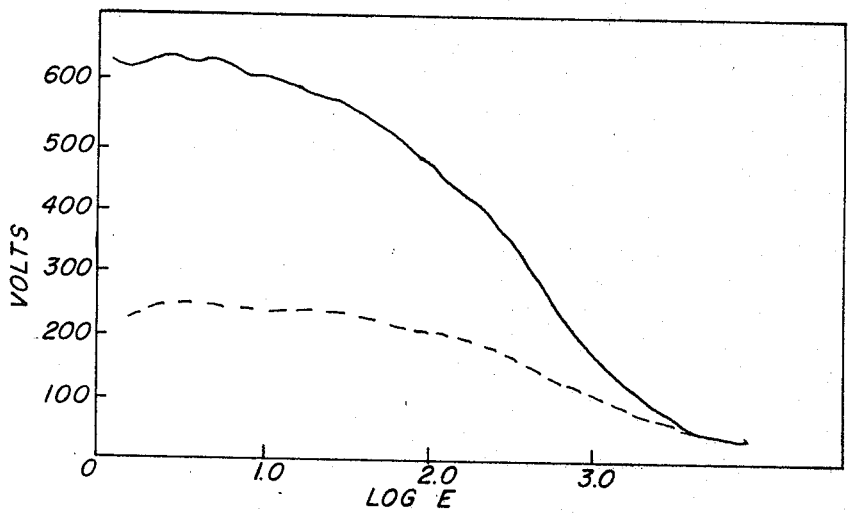
*FIG. 6*
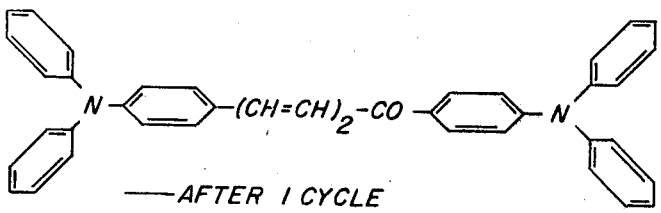
— AFTER 1 CYCLE
---- AFTER 10 CYCLES
CHARLES J. FOX
INVENTOR.
BY *J. Wm Berkstresser*
ATTORNEY 3,526,501
4-DIARYLAMINO-SUBSTITUTED CHALCONE CONTAINING PHOTOCONDUCTIVE COMPOSITIONS FOR USE IN ELECTROPHOTOGRAPHY
Charles J. Fox, Rochester, N.Y., assignor to Eastman Kodak Company, Rochester, N.Y., a corporation of New Jersey
Filed Feb. 3, 1967, Ser. No. 613,846
Int. Cl. G03g 5/06, 13/22
U.S. Cl. 96—1.5                           13 Claims

ABSTRACT OF THE DISCLOSURE

Organic photoconductor-containing compositions and elements are provided with high electrophotographic speeds and high regeneration capability by the use of novel 4-diarylamino-substituted chalcones.

---

This invention relates to novel photoconductors and to organic photoconductor-containing electrophotographic elements having enhanced photoconductivity when electrically charged.

An electrophotographic process, xerography, disclosed by Carlson in U.S. 2,297,691, employs an electrophotographic element comprising a conducting support material bearing a coating of a photoconductive material which is a normally insulating material whose electrical resistance varies with the amount of incident actinic radiation it received during an imagewise exposure. The electrophotographic element, commonly termed a photoconductive element, when used in a xerographic reproduction process is first given a uniform surface charge in the dark after a suitable period of dark adaptation. It is then exposed to a pattern of actinic radiation which has the effect of reducing the potential of the surface charge in accordance with the relative energy contained in various parts of the radiation pattern. The resultant differential surface charge or latent electrostatic image remaining on the electrophotographic element is then made visible by contacting the surface with a suitable electroscopic marking material. Such marking material or toner may be selected to be electrostatically responsive to the presence or absence of electrical charge on the surface in accordance with the imagewise charge pattern. The deposited marking material may then be either permanently fixed to the surface of the sensitive element by known means, such as heat, pressure, solvent vapor, or the like, or transferred to a second element to which it may similarly be fixed.

Various photoconductive insulating materials have been employed in the manufacture of electrophotographic elements. Selenium and selenium alloys vapor deposited on a suitable support and particles of photoconductive zinc oxide, held in a resinous, film-forming binder, have found wide application in present-day document copying applications.

Recently, some organic compounds have been discovered which demonstrate a useful level of photoconductivity. Most organic photoconductors have the advantage of being capable of being uniformly coated in the form of a film or layer. Many organic photoconductor compositions, when coated as a film or layer on a suitable support, yield an element which may be transparent and is generally reusable; that is, it can be used to form subsequent images. At the present time, the search for organic compounds for use in photoconductor compositions to form electrophotographic layers has been forced to proceed on a compound-by-compound basis. Nothing has yet been discovered from the large number of known photoconductive substances which permits effective prediction of new compounds or structural relationships which will produce enhanced photoconduction when used in electrophotographic applications.

It is an object of this invention to provide novel photoconductive elements containing at least one organic photoconductor in an amount sufficient to be useful in electrophotographic applications.

It is another object of this invention to provide particularly effective specific novel photoconductive compounds.

It is also an object of this invention to provide photoconductive elements having substantially instantaneous regeneration making them suitable for duplication and image add-on applications.

It is a further object of this invention to provide new photoconductive elements containing organic photoconductive compounds that can be effectively sensitized to a high electrophotographic speed by the addition of pyrylium, thiapyrylium, selenapyrylium and other dye sensitizers.

The foregoing and further objects and advantages of this invention, which will be apparent from the following description, have been achieved by the discovery of the unusual electrophotosensitivity of 4-diarylamino-substituted chalcones. Typical compounds of this type are low molecular weight non-polymeric ketones having the general formula:

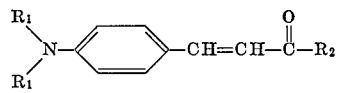

wherein $R_1$ and $R_2$ are each phenyl radicals including substituted phenyl radicals and particularly $R_2$ is a phenyl radical having the formula:

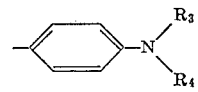

wherein $R_3$ and $R_4$ are each aryl radicals, aliphatic residues of 1 to 12 carbon atoms such as alkyl radicals preferably having 1 to 4 carbon atoms, or hydrogen. Particularly advantageous results are obtained according to this invention when $R_1$ is a phenyl radical including substituted phenyl radicals, and where $R_2$ is diphenylaminophenyl, dimethylaminophenyl or phenyl.

Many compounds of the chalcone class have shown photo-conductive activity when incorporated into suitable structures and tested for electrophotographic usefulness. In particular, compounds corresponding to the general formula are known in which the $R_1$ is alkyl and $R_2$ is dialkylamino phenyl, or in which the —CH=CH— group is repeated two or more times. Quite surprisingly the photoconductive properties of similar compounds in which $R_1$ is aryl are unexpectedly superior to those of the analogous compounds in which $R_1$ is other than aryl forming, for example, a dialkylamino substituent. In addition to the observed superiority of the 4-diarylamino-substituted chalcones, the electrophotographic properties of compounds corresponding to the herein described general formula, but where the —CH=CH— group is repeated, show a substantially lesser electrophotosensitivity than do the compounds of this invention where the —CH=CH— group is not repeated and is positioned nearest the diphenylamino-substituted end of the molecule. In the compounds of this invention both the electrophotographic speeds and the regeneration properties are substantially better than would be anticipated from an investigation of other chalcone compounds. "Regeneration" as the term is used herein is the ability of the element to be repeatedly charged to substantially the same potential during a series of charging and exposing cycles. Poor regeneration prevents full charging between cycles and may cause a spurious image or ghost to appear from a previous exposure. This undesirable phenomenon is avoided in the practice of the invention described herein.

Referring to the drawings:

FIG. 1 is an electrophotosensitivity curve for the indicated compound in a coating prepared as in Example 1.

FIG. 2 is an electrophotosensitivity curve for the indicated compound in a coating prepared as in Example 1.

FIG. 3 is an electrophotosensitivity curve for the indicated compound in a coating prepared as in Example 1.

FIG. 4 is a pair of electrophotosensitivity curves comparing the results of the two compounds indicated, each contained in coatings prepared as in Example 1.

FIG. 5 is a pair of electrophotosensitivity curves showing the regeneration capability of the indicated compound.

FIG. 6 is a pair of electrophotosensitivity curves showing the regeneration capability of the indicated compound.

The novel preferred compounds of this invention together with structurally similar compounds are illustrated by the following formulas.

TABLE I

Formula I.—4,4'-bis(diphenylamino)chalcone:

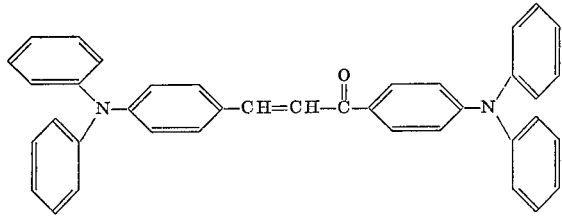

Formula II.—4-diphenylamino-4'-dimethylamino chalcone:

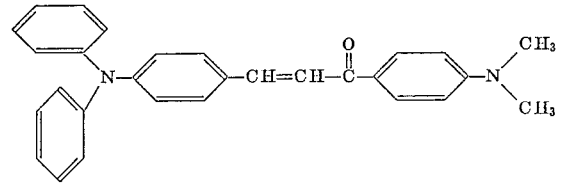

Formula III.—4-dimethylamino-4'-diphenylamino chalcone:

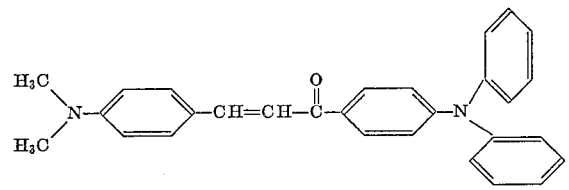

Fomula IV.—4,4'-bis(dimethylamino)chalcone:

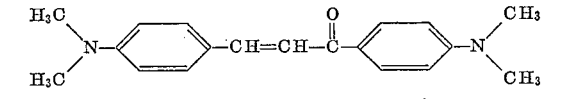

Formula V.—4,4'-bis(diethylamino)chalcone:

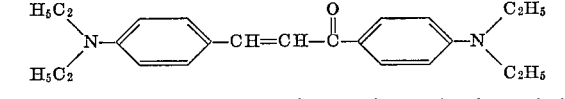

Formula VI.—4-diethylamino-4'-diphenylamino chalcone:

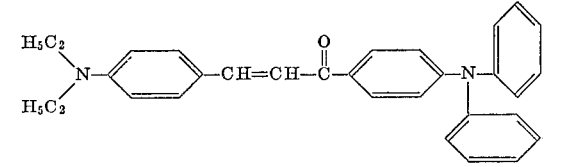

Formula VII.—4,4'-bis(n-amyloxy)chalcone:

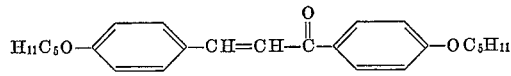

Formula VIII.—4,4'-bis nitro chalcone:

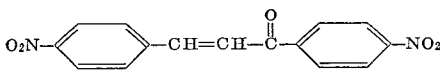

Formula IX.—4-diphenylamino chalcone:

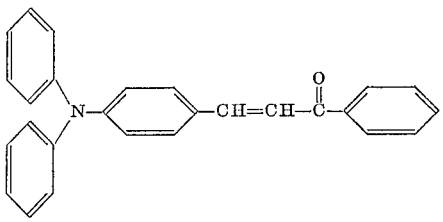

Formula X.—4-dimethylamino chalcone:

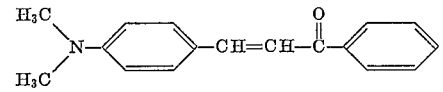

Formula XI.—4'-diphenylamino chalcone:

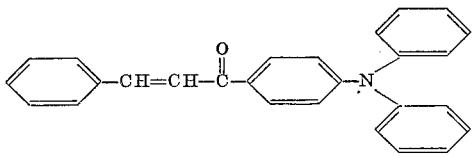

Formula XII.—4'-dimethylamino chalcone:

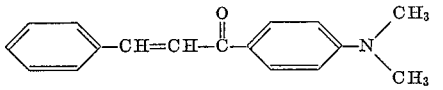

Formula XIII.—1 - (4 - diphenylaminophenyl) - 3 - (4-julolidinyl)-2-propen-1-one:

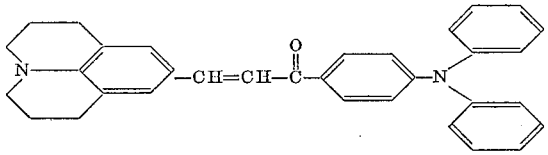

Formula XIV.—4 - diphenylaminocinnamylidene-4'-diphenylaminoacetophenone:

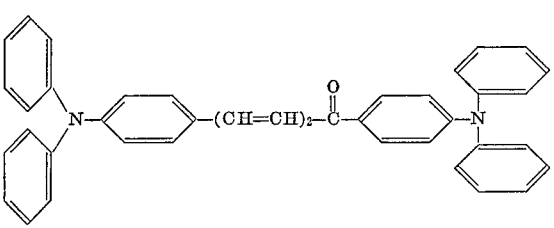

Formula XV.—4-dimethylaminocinnamylidene - 4' - diphenylaminoacetophenone:

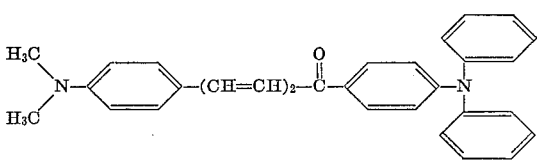

Formula XVI.—4 - dimethylaminocinnamylidene-4'-dimethylaminoacetophenone:

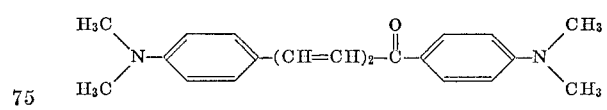

The differences in the electrophotographic properties exhibited between compounds in the foregoing table will be more fully developed hereinafter.

Electrophotographic elements can be prepared from the compounds in the normal manner, i.e., by blending a dispersion or solution of a photoconductive compound together with a binder, when necessary or desirable, and coating or forming a self-supporting layer with the photoconductor-containing material. In addition, supplemental materials useful for changing the spectral sensitivity or electrophotosensitivity of the element can be added to the composition of the element when it is desirable to produce the characteristic effect of such materials.

Preferred binders for use in preparing the photoconductive layers comprise polymers having fairly high dielectric strength which are good electrically insulating film-forming vehicles. Materials of this type comprise styrene-butadiene copolymers; silicone resins; styrene-alkyd resins; silicone-alkyd resins; soya-alkyd resins; poly(vinyl chloride); poly(vinylidene chloride); vinylidene chloride-acrylonitrile copolymers; poly(vinyl acetate); vinyl acetate-vinyl chloride copolymers; poly(vinyl acetals), such as poly(vinyl butyral); polyacrylic and methacrylic esters, such as poly(methylmethacrylate), poly(n-butylmethacrylate), poly(isobutyl methacrylate), etc.; polystyrene; nitrated polystyrene; polymethylstyrene; isobutylene polymers; polyesters, such as poly(ethylenealkaryloxyalkylene terephthalate); phenol-formaldehyde resins; ketone resins; polyamide; polycarbonates; polythiocarbonates; poly(ethyleneglycol-co-bishydroxyethoxyphenyl propane terephthalate); etc. Methods of making resins of this type have been described in the prior art, for example, styrene-alkyd resins can be prepared according to the method described in U.S. Pats. 2,361,019 and 2,258,423. Suitable resins of the type contemplated for use in the photoconductive layers of the invention are sold under such trade names as Vitel PE–101, Cymac, Piccopale 100, and Saran F–220 and Lexan 105. Other types of binders which can be used in the photoconductive layers of the invention include such materials as paraffin, mineral waxes, etc.

Solvents of choice for preparing coating compositions of the present invention can include a number of solvents such as benzene, toluene, acetone, 2-butanone, chlorinated hydrocarbons, e.g., methylene chloride, ethylene chloride, etc., ethers e.g., tetrahydrofuran, or mixtures of these solvents, etc.

In preparing the coating composition useful results are obtained where the photoconductor substance is present in an amount equal to at least about 1 weight percent of the coating composition. The upper limit in the amount of photoconductor substance present can be widely varied in accordance with usual practice. In those cases where a binder is employed, it is normally required that the photoconductor substance be present in an amount from about 1 weight percent of the coating composition to about 99 weight percent of the coating composition. A preferred weight range for the photoconductor substance in the coating composition is from about 10 weight percent to about 60 weight percent.

Coating thicknesses of the photoconductive composition on a support can vary widely. Normally, a coating in the range of about 0.001 inch to about 0.01 inch before drying is useful for the practice of this invention. The preferred range of coating thickness was found to be in the range from about 0.002 inch to about 0.006 inch before drying although highly useful results can be obtained outside of this range.

Suitable supporting materials for coating the photoconductive layers of the present invention can include any of a wide variety of electrically conducting supports, for example, paper (at a relative humidity above 20 percent); aluminum-paper laminates; metal foils such as aluminum foil, zinc foil, etc.; metal plates, such as aluminum, copper, zinc, brass, and galvanized plates; vapor deposited metal layers such as silver or aluminum and the like. An especially useful conducting support can be prepared by coating a support material such as polyethylene terephthalate with a layer containing a semiconductor dispersed in a resin. Such conducting layers both with and without insulating barrier layers are described in U.S. Pat. 3,245,833. Likewise, a suitable conducting coating can be prepared from the sodium salt of a carboxyester lactone of maleic anhydride and a vinyl acetate polymer. Such kinds of conducting layers and methods for their optimum preparation and use are disclosed in U.S. 3,007,901 and 3,267,807.

The elements of the present invention can be employed in any of the well-known electrophotographic processes which require photoconductive layers. One such process is the xerographic process. In a process of this type, the electrophotographic element is given a blanket electrostatic charge by placing the same under a corona discharge which serves to give a uniform charge to the surface of the photoconductive layer. This charge is retained by the layer owing to the substantial insulating property of the layer, i.e., the low conductivity of the layer in the dark. The electrostatic charge formed on the surface of the photoconducting layer is then selectively dissipated from the surface of the layer by exposure to light through an image-bearing transparency by a conventional exposure operation such as, for example, by contact-printing technique, or by lens projection of an image, etc., to form a latent image in the photoconducting layer. By exposure of the surface in this manner, a charged pattern is created by virtue of the fact that light causes the charge to be conducted away in proportion to the intensity of the illumination in a particular area. The charge pattern remaining after exposure is then developed, i.e., rendered visible, by treatment with a medium comprising electrostatically attractable particles having optical density. The developing electrostatically attractable particles can be in the form of a dust, e.g., powder, a pigment in a resinous carrier, i.e., toner, or a liquid developer may be used in which the developing particles are carried in an electrically insulating liquid carrier. Methods of development of this type are widely known and have been described in the patent literature in such patents, for example, as U.S. Pat. 2,297,691, and in Australian Pat. 212,315. In processes of electrophotographic reproduction such as in xerography, by selecting a developing particle which has as one of its components, a low-melting resin, it is possible to treat the developed photoconductive material with heat and cause the powder to adhere permanently to the surface of the photoconductive layer. In other cases, a transfer of the image formed on the photoconductive layer can be made to a second support, which would then become the final print. Techniques of the type indicated are well known in the art and have been described in a number of U.S. and foreign patents, such as U.S. Pats. 2,297,691 and 2,551,582, and in "RCA Review," vol. 15 (1954), pp. 469–484.

The present invention is not limited to any particular mode of use of the new electrophotographic materials, and the exposure technique, the charging method, the transfer (if any), the developing method, and the fixing method as well as the materials used in these methods can be selected and adapted to the requirements of any particular technique.

Electrophotographic materials according to the present invention can be applied to reproduction techniques wherein different kinds of radiations, i.e., electromagnetic radiations as well as nuclear radiations, can be used. For this reason, it is pointed out herein that although materials according to the invention are mainly intended for use in connection with methods comprising an exposure, the term "electrophotography" wherever appearing in the description and the claims, is to be interpreted broadly and understood to comprise both xerography and xeroradiography.

The photoconductive layers of the invention can also be sensitized to highly improved speed. Sensitizing compounds useful with the photoconductive compounds of the present invention can include a wide variety of substances such as the pyrylium, thiapyrylium, and selenapyrylium salts of U.S. Pat. 3,250,615, issued May 10, 1966; fluorenes, such as 7,12-dioxo-13-dibenzo(a,h)fluorene, 5,10-dioxo-4a,11-diazabenzo(b)fluorene, 3,13-dioxo-7-oxadibenzo(b,g)fluorene, trinitrofluorenone, tetranitrofluorenone and the like; aromatic nitro compounds of U.S. Pat. 2,610,120; anthrones of U.S. Pat. 2,670,285; quinones of U.S. Pat. 2,670,286; benzophenones of U.S. Pat. 2,670,287; thiazoles of U.S. Pat. 2,732,301; mineral acids, carboxylic acids, such as maleic acid, dichloroacetic acid, and salicylic acid; sulfonic and phosphoric acids; and various dyes such as triphenylmethane, diarylmethane, thiazine, azine, oxazine, xanthene, phthalein, acridine, azo, anthraquinone dyes and many other suitable sensitizing dyes. The preferred sensitizers for use with the compounds of this invention are pyrylium and thiapyrylium salts, fluorenes, carboxylic acids, and triphenylmethane dyes.

Where a sensitizing compound is to be used within a photoconductive layer as disclosed herein it is conventional practice to mix a suitable amount of the sensitizing compounds with the coating composition so that, after thorough mixing, the sensitizing compound is uniformly distributed throughout the desired layer of the coated element. In preparing the photoconducting layers, no sensitizing compound is needed for the layer to exhibit photoconductivity. The lower limit of sensitizer required in a particular photoconductive layer is, therefore, zero. However, since relatively minor amounts of sensitizing compound give substantial improvement in the electrophotographic speed of such layers, the use of some sensitizer is preferred. The amount of sensitizer that can be added to a photoconductor-incorporating layer to give effective increases in speed can vary widely. The optimum concentration in any given case will vary with the specific photoconductor and sensitizing compound used. In general, substantial speed gains can be obtained where an appropriate sensitizer is added in a concentration range from about 0.0001 to about 30 percent by weight based on the weight of the film-forming hydrophobic coating composition. Normally, a sensitizer is added to the coating composition in an amount by weight from about 0.005 to about 5.0 percent by weight of the total coating composition.

The invention will now be described by reference to the following examples. The sensitizers referred to therein are designated as follows.

TABLE II

Sensitizer:

Chemical name

A ____ 2,6 - bis(4 - ethylphenyl) - 4 - (4 - n - amyloxyphenyl) thiapyrylium perchlorate.

B ____ 2,4,7-trinitrofluorenone.

C ____ Rhodamine B.

D ____ 2,4 - bis(4 - ethoxyphenyl) - 6 - (4 - n - amyloxystyryl) pyrylium fluoroborate.

E ____ 2,4 - bis(4 - ethylphenyl) - 6 - (4 - styrylstyryl) pyrylium perchlorate.

EXAMPLE 1

A photoconductive composition containing 4,4'-bis(diphenylamino)chalcone as the photoconductive material was prepared for coating on a conducting support material by mixing 0.15 part of the photoconductor with 0.002 part by weight of sensitizer A and dissolving these together with 0.5 part by weight of a resinous polyester binder with suitable stirring in dichloromethane. The resultant mixture was then hand-coated on aluminum-laminated paper support. The polyester used as a binder in this coating composition is a copolymer of terephthalic acid and a glycol mixture comprising a 9:1 wt. ratio of 2,2-bis[4-($\beta$-hydroxyethoxy)phenyl]propane and ethylene glycol. The wet coating thickness on the support was 0.004 inch. After drying the electrophotographic element was employed in a standard xerographic process which included charging under a positive corona and exposure from behind a transparency to a 3000° K. tungsten source of 20-foot-candle intensity at the point of exposure. The resulting electrostatic latent image on the element was rendered visible by dusting the exposed surface of the element with an electrostatically responsive powder having optical density according to the method and materials described in U.S. Pat. 2,297,691. According to the example, a high-quality positive image of the transparency was obtained.

EXAMPLE 2

The procedure of Example 1 was followed in preparing an electrophotographic element using 0.15 part of 4-diphenylamino chalcone as the photoconductor in the coating composition. Exposure of the element and development by the method of Example 1 produced a visible image.

EXAMPLE 3

The procedure of Example 1 was followed in preparing an electrophotographic element using 4-diphenylamino-4'-dimethylamino chalcone as the photoconductor in the coating composition. Exposure of the element and development by the method of Example 1 produced a visible image.

EXAMPLE 4

The procedure of Example 1 was followed in preparing an electrophotographic element wherein the sensitizer used was sensitizer D. Testing by the method of Example 1 produced a visible image.

EXAMPLE 5

The procedure of Example 2 was followed in preparing an electrophotographic element wherein the sensitizer used was sensitizer E. Testing by the method of Example 1 produced a visible image.

EXAMPLE 6

The procedure of Example 3 was followed in preparing an electrophotographic element wherein sensitizer D was used.

EXAMPLE 7

Symmetrical chalcones

Elements prepared according to the method of Example 1 using one of sensitizers A, B, C, D or E and a photoconductive compound from Table I as indicated hereinafter and elements each containing one of the photoconductive compounds but not containing any sensitizer were tested by the following procedure: Each element was charged under a positive corona until the surface potential, as measured by an electrometer probe, reached 600 volts. It was then exposed to a light source in the manner of Example 1, with the exception that the transparency was replaced by a stepped density gray scale. The exposure caused reduction of the surface potential of the element under each step of the gray scale from its initial potential, $V_0$, to some lower potential, V, whose exact value depended on the actual amount of exposure received by the area. The results of these measurements were then plotted on a graph of surface potential V vs. log exposure for each step in a manner similar to FIGS. 1 through 6. The actual speed of each element can then be expressed in terms of the reciprocal of the exposure required to reduce the surface potential to any fixed arbitrarily assigned value. Numerically, the speed is the quotient of $10^4$ divided by the exposure in meter-candle-seconds required to reduce the potential to 100 volts. The results of these measurements at 100 volts are presented in Table III.

TABLE III

| Compound | Sensitizer | | | | |
|---|---|---|---|---|---|
| | None | A | B | C | D | E |
| I | 0 | 80 | 30 | 40 | 140 | 160 |
| IV | 0 | 12 | 12 | 16 | 20 | 16 |
| V | 0 | 0 | 0 | 0 | 25 | 16 |
| VII | 0 | 0 | 0 | 0 | 0 | 0 |
| VIII | 0 | 0 | 0 | 0 | | |

This example shows that the electrophotographic activity of the symmetrically substituted chalcone having diphenylamino groups as substituents (Formula I and FIG. 1) is considerably greater than that of chalcones similarly substituted with dialkylamino groups such as dimethylamino (Formula IV and FIG. 3) or diethylamino (Formula V) or with other groups such as nitro (Formula VIII) or or alkoxy (Formula VII).

EXAMPLE 8

4-substituted-4'-diphenylamino chalcones

Elements prepared according to the method of Example 1 but using as photoconductors those compounds from Table I indicated hereinafter were tested according to the method of Example 7. The results are presented in Table IV.

TABLE IV

| Compound | Sensitizer | | | |
|---|---|---|---|---|
| | None | A | D | E |
| I | 0 | 80 | 140 | 160 |
| III | 0 | 10 | 16 | 20 |
| VI | 0 | 0 | 8 | 0 |
| XI | 0 | 20 | 32 | |
| XIII | 0 | 0 | | |

This example shows that the electrophotographic activity of the 4-substituted-4'-diphenylamino chalcones is strongly dependent on the nature of the substituent. The absence of a substituent (Formula XI) gives results superior to those obtained when the substituent is dimethylamino (Formula III), diethylamino (Formula VI), or when a heterocyclic ring system is condensed with the aromatic ring (Formula XIII). Only the 4,4'-bis(diphenylamino)chalcone (Formula I) has a higher speed.

EXAMPLE 9

4-substituted-4'-dimethylamino chalcones

Elements prepared according to the method of Example 1 but using as photoconductors those compounds from Table I indicated hereinafter were tested according to the method of Example 7. The results are presented in Table V.

TABLE V

| Compound | Sensitizer | | | |
|---|---|---|---|---|
| | None | A | D | E |
| II | 0 | 50 | 85 | 90 |
| IV | 0 | 12 | 20 | 16 |
| XII | 0 | 0 | 0 | |

This example shows that the 4-substituted-4'-dimethylamino chalcone having a diphenylamino substituent (Formula II and FIG. 2) gives higher electrophotographic speeds than does either the corresponding dimethylamino substituted (Formula IV and FIG. 3) or the corresponding unsubstituted chalcone (Formula XII).

EXAMPLE 10

4-substituted chalcones

Elements prepared according to the method of Example 1 but using as photoconductors those compounds from Table I indicated hereinafter were tested according to the method of Example 7. The results are presented in Table VI.

TABLE VI

| Compound | Sensitizer | | |
|---|---|---|---|
| | None | A | D |
| IX | 0 | 70 | 130 |
| X | 0 | 6 | 12 |

This example shows that the 4-substituted chalcone having a diphenylamino substituent (compound IX) gives much higher electrophotographic speeds than does the corresponding dimethylamino-substituted compound (compound X).

EXAMPLE 11

Effect of conjugated —CH=CH— group

This example compares the 4,4'-bis(diphenylamino) chalcone (Formula I, FIG. 1 and FIG. 4), the 4-dimethylamino-4'-diphenylamino chalcone (Formula III) and the 4,4'-bis(dimethylamino)chalcone with their corresponding vinylogs (Formulas XIV and FIG. 4, XV, and XVI, respectively) for $n=1$ and $n=2$ in a general formula similar to that shown in FIG. 4. Elements prepared according to the method of Example 1 but using as photoconductors those compounds from Table I indicated hereinafter were tested according to the method of Example 7. The results are presented in Table VII.

TABLE VII

| Compound | n | Sensitizer | | | | |
|---|---|---|---|---|---|---|
| | | None | A | B | C | D | E |
| I | 1 | 0 | 80 | 30 | 40 | 140 | 160 |
| XIV | 2 | 0 | 5 | 0 | | 8 | 12 |
| III | 1 | 0 | 10 | | | 16 | 20 |
| XV | 2 | 0 | 4 | | 10 | 12 | 4 |
| IV | 1 | 0 | 12 | 12 | 16 | 20 | 16 |
| XVI | 2 | 0 | 0 | | 0 | 0 | 0 |

This example shows that in the case of the symmetrically substituted diphenylamino and dimethylamino chalcones (Formulas I and IV) and their corresponding vinylogs (Formulas XIV and XVI), the electrophotographic effectiveness is much greater for the simple chalcones ($n=1$) than for their vinylogs ($n=2$ or more). The same is true for the asymmetrically substituted 4-dimethylamino-4'-diphenylamino chalcone and its corresponding vinylog. An illustration of the difference between the simple chalcones and their vinylogs is shown in FIGS. 5 and 6. Repeated use of the comparison elements shows a deterioration in the electrophotographic response of the vinylog-containing element.

EXAMPLE 12

Synthesis of 4,4'-bis(diphenylamino)chalcone (A) Synthesis of 4-formyltriphenylamine.—4-formyltriphenylamine may be conveniently synthesized as described by Baker et al., J. Org. Chem., 30, 3717 (1965).

(B) Synthesis of 4-acetyltriphenylamine.—4-acetyltriphenylamine is prepared by the general method described by Fox et al., J. Org. Chem., 29, 3536 (1964).

(C) Synthesis of 4,4'-bis(diphenylamino)chalcone.— A solution consisting of 8.19 g. (0.3 mole) of 4-formyltriphenylamine in 200 ml. of absolute ethanol at 35° C. was added rapidly to a stirred solution consisting of 8.67 g. (.03 mole) of 4-acetyltriphenylamine and 1.62 g. (.03 mole) of sodium methylate in 200 ml. of absolute ethanol at 35° C. The resulting solution was stirred continuously for 144 hours at room temperature. The orange product which separated from solution was isolated by filtration and was then washed with absolute alcohol. 15.7 g. (0.29 mole, 96.7% yield) of crude product, M.P. 122–145° C., was obtained. Recrystallization from hexane yielded a yellow microcrystalline substance, M.P.=88–91° C., while recrystallization from ethanol produced orange crystals, M.P.=150–151° C. The ultraviolet, visible, and infrared spectra of the crude product were identical to those of the yellow and orange crystals.

Calcd. for C₃₉H₃₀ON₂ (percent): N, 5.2; molecular weight 542. Found (percent): N, 5.0; molecular weight 558+29.

EXAMPLE 13

Synthesis of compounds II and IX

The procedure of Example 12(C) was used in the synthesis of 4-diphenylamino-4'-dimethylamino chalcone and 4-diphenylamino chalcone, using the starting materials indicated in Table VIII.

TABLE VIII

| Compound | Analysis (percent N) | | M.P. | Starting materials | |
|---|---|---|---|---|---|
| | Calcd. | Found | | Aldehyde | Active Methylene Compound |
| II | 6.9 | 6.9 | 159–164 | (C₆H₅)₂N–⟨C₆H₄⟩–CHO  4-diphenylamino-benzaldehyde | CH₃–CO–⟨C₆H₄⟩–N(CH₃)₂  4-dimethylamino-acetophenone |
| IX | 3.7 | 3.6 | 120–126 | (C₆H₅)₂N–⟨C₆H₄⟩–CHO  4-diphenylamino-benzaldehyde | CH₃C(O)–⟨C₆H₅⟩  Acetophenone |

It will be apparent from the foregoing examples and description that the materials of this invention permit the effective formation of electrophotographic compositions which are capable of many structural variations. For example, the photoconductive compositions containing the compounds of this invention can be coated in the form of single layers or multiple layers on a suitable opaque or transparent conducting support. Likewise, the layers can be contiguous or spaced having layers of insulating material or other photoconducting material between layers or overcoated or interposed between the photoconducting layer or sensitizing layer and the conducting layer. It is also possible to adjust the position of the support and the conducting layer by placing a photoconductor layer over a support and coating the exposed face of the support or the exposed or overcoated face of the photoconductor with a conducting layer. Configurations differing from those contained in the examples can be useful or even preferred for the same or different application for the electrophotographic element.

Likewise, it is not essential to obtaining the advantages of the present invention to employ any particular substituents on the aryl radicals of the herein described 4-diarylamino chalcones. Various substituents, for example, hydrogen, halogens, alkoxy, aryloxy, alkyl, aryl, acyl, aroyl, carboxyl, carbalkoxy, carbaryloxy, nitrile, nitro and 4-diarylamino cinnamoyl radicals can all be advantageously employed.

The invention has been described in detail with particular reference to preferred embodiments thereof, but it will be understood that variations and modifications can be effected within the spirit and scope of the invention as described hereinbefore and as defined in the appended claims.

I claim:

1. An electrophotographic material comprising a support having a photoconductive composition contained thereon wherein at least one of the photoconductive constituents of said photoconductive composition is a compound of the formula:

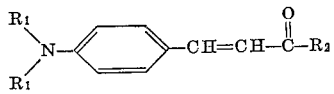

wherein R₁ and R₂ are each phenyl radicals, said photoconductive composition containing a dye salt sensitizing compound in an amount effective to sensitize at least one of the photoconductive constituents of said photoconductive composition.

2. The electrophotographic material of claim 1 containing 4,4'-bis(diphenylamino)chalcone.

3. The electrophotographic material of claim 1 containing 4-diphenylamino-4'-dimethylamino chalcone.

4. The electrophotographic material of claim 1 containing 4-diphenylamino chalcone.

5. The electrophotographic material of claim 1 wherein the sensitizer is selected from the group consisting of pyrylium, thiapyrylium, selenapyrylium, fluorene, and triarylmethane dye salts.

6. The electrophotographic material of claim 1 wherein the sensitizer is 2,6-bis(4-ethylphenyl)-4-(4-n-amyloxyphenyl) thiapyrylium perchlorate.

7. The electrophotographic material of claim 1 wherein the sensitizer is 2,4-bis(4-ethoxyphenyl)-6-(4-n-amyloxystyryl) pyrylium fluoroborate.

8. The electrophotographic material of claim 1 wherein the sensitizer is 2,4-bis(4-ethylphenyl)-6-(4-styrylstyryl) pyrylium perchlorate.

9. The electrophotographic material of claim 1 wherein said photoconductive composition further comprises a resinous film-forming binder selected from the group consisting of polyvinyl resins, polycarbonate resins, polythiocarbonate resins, polyesters and copolymers containing at least one of the foregoing resins.

10. An electrophotographic element comprising a support having coated thereon a photoconductive composition comprising
 (a) 4,4'-bis(diphenylamino)chalcone as the organic photoconductor;
 (b) a film-forming polymeric binder for said photoconductor; and
 (c) 0.005 percent to about 5 percent by weight based on said photoconductive composition of a sensitizer for said photoconductive composition.

11. An electrophotographic element comprising a support having coated thereon a photoconductive composition comprising
 (a) 4-diphenylamino-4'-dimethylamino chalcone as the organic photoconductor;
 (b) a film-forming polymeric binder for said photoconductor; and
 (c) 0.005 percent to about 5 percent by weight based on said photoconductive composition of a sensitizer for said photoconductive composition.

12. An electrophotographic element comprising a support having coated thereon a photoconductive composition comprising
 (a) 4-diphenylamino chalcone as the organic photoconductor;
 (b) a film-forming polymeric binder for said photoconductor; and
 (c) 0.005 percent to about 5 percent by weight based on said photoconductive composition of a sensitizer for said photoconductive composition.

13. A method of forming developed electrostatic images comprising the steps of:

(1) exposing to a pattern of light and shadow a uniformly electrostatically charged photoconductive insulating layer on a support, which layer comprises a 4-diarylamino-substituted chalcone photoconductor having the formula:

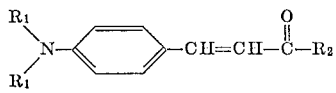

wherein $R_1$ and $R_2$ are each phenyl radicals, said photoconductive insulating layer containing a dye salt sensitizing compound in an amount effective to sensitize at least one of the photoconductors in said photoconductive insulating layer; and (2) developing the resultant latent electrostatic charge image.

References Cited

UNITED STATES PATENTS

| 3,148,982 | 9/1964 | Ghys et al. | 96—1 |
| 3,158,475 | 11/1964 | Cassiers et al. | 96—1 |
| 3,257,202 | 6/1966 | Schlesinger et al. | 96—1.5 |
| 3,265,497 | 8/1966 | Kosche | 96—1.1 |
| 3,265,497 | 8/1966 | Kosche | 96—1.1 |
| 3,331,687 | 7/1967 | Kosche | 96—1.5 |
| 3,387,973 | 6/1968 | Fox et al. | 96—1.5 |
| 3,390,186 | 6/1968 | Normant | 260—590 |

GEORGE F. LESMES, Primary Examiner

J. C. COOPER III, Assistant Examiner

U.S. Cl. X.R.

96—1, 1.4; 252—50.1; 260—576